United States Patent
Yamada

[19]

[11] Patent Number: 6,016,883
[45] Date of Patent: Jan. 25, 2000

[54] TWO WHEEL/FOUR WHEEL DRIVE SHIFTING DEVICE INCLUDING AN INDICATOR

[75] Inventor: Hiroaki Yamada, Shizuoka-ken, Japan

[73] Assignee: Suzuki Motor Corporation, Hamamatsu, Japan

[21] Appl. No.: 08/949,660

[22] Filed: Oct. 14, 1997

[30] Foreign Application Priority Data

Oct. 30, 1996 [JP] Japan .................................. 8-304007

[51] Int. Cl.$^7$ ................................................. B60K 23/08
[52] U.S. Cl. ...................... 180/247; 180/233; 192/85 R
[58] Field of Search .................................. 180/247, 233; 192/50, 85 V, 85 A, 114 R, 86

[56] References Cited

U.S. PATENT DOCUMENTS

| | | | |
|---|---|---|---|
| 4,960,192 | 10/1990 | Kurihara | 180/247 |
| 5,085,304 | 2/1992 | Barroso | 180/247 |
| 5,148,901 | 9/1992 | Kurihara et al. | 192/67 R |
| 5,257,682 | 11/1993 | Kuroki | 192/88 A |
| 5,353,890 | 10/1994 | Clohessy | 180/247 |
| 5,799,748 | 9/1998 | Origuchi | 180/223 |

FOREIGN PATENT DOCUMENTS 4-66731  10/1992  Japan .

*Primary Examiner*—Daniel G. DePumpo
*Attorney, Agent, or Firm*—Flynn, Thiel, Boutell & Tanis, P.C.

[57] ABSTRACT

A two/four wheel drive shifting device capable of detecting a success or failure in shifting of a free wheel mechanism to a locked state without encumbering components for detecting free and locked states of the free wheel mechanism being directly disposed in the free wheel mechanism. The two/four wheel drive shifting device has a two/four wheel drive shifting mechanism disposed in a transfer mechanism, a device for detecting shifting between two wheel and four wheel drive, an indicator for showing the shifting, an actuator for shifting a free wheel mechanism which is disposed in either a front wheel or a rear wheel differential mechanism, a pressure pump for supplying working pressure, a pressure detector for detecting the working pressure, and a control to actuate the pressure pump to supply working pressure to the actuator when shifting to four wheel drive is successful. The control also deactivates the pressure pump and actuates the indicator in order to show a successful shifting to four wheel drive when the working pressure has achieved a predetermined pressure.

8 Claims, 5 Drawing Sheets

TWO WHEEL/FOUR WHEEL DRIVE SHIFTING DEVICE INCLUDING AN INDICATOR

FIELD OF THE INVENTION

This invention relates to a two wheel drive to four wheel drive shifting device and, more particularly, to a two/four wheel drive shifting device capable of detecting a success or failure in shifting of a free wheel mechanism into a locked state without any means for detecting free and locked states of the free wheel mechanism being directly disposed in the free wheel mechanism, whereby the two/four wheel drive shifting device is achievable with fewer components and at lower cost, and whereby the two/four wheel drive shifting device may notify the vehicle's driver of a successful shifting into four wheel drive.

BACKGROUND OF THE INVENTION

In certain vehicles, the internal combustion engine is connected to a transmission, from which driving force is delivered to a transfer mechanism, and the transfer mechanism then feeds and distributes the driving force to the front and rear wheels. In such vehicles, a drive shifting device is associated with the transfer mechanism and interrupts the driving force which is to be fed to either the front or rear wheels, thereby providing shifting between two wheel and four wheel drive.

The above type of vehicle is illustrated in FIG. 9 wherein 302 denotes the vehicle, 304 the front wheels, and 306 the rear wheels. The vehicle 302 has an internal combustion engine 308 disposed therein and connected to a transmission 310. The transmission 310 is linked to a transfer mechanism 312.

The transfer mechanism 312 causes the driving force received from the engine 308 through the transmission 310 to be fed and distributed to a front wheel drive shaft 314 and a rear wheel drive shaft 316. A front wheel differential mechanism 318 and a rear wheel differential mechanism 320 permit the distributed driving force to be transmitted respectively to the front and rear wheels 304 and 306 through front wheel axles 322 and rear wheel axles 324.

The vehicle 302 is provided with a two/four wheel drive shifting device 326. This device 326 has a two/four wheel drive shifting mechanism 328 disposed in the transfer mechanism 312. This mechanism 328 has a transfer shift lever 330. The lever 330 is shifted to interrupt the driving force which is to be delivered to either the front wheels 304 or the rear wheels 306, thereby providing a shift between the two wheel drive and the four wheel drive configurations of the drive train. The mechanism 328 illustrated in FIG. 9 interrupts the driving force to be fed through the transfer 312 to the front wheels 304, thereby providing shift between two wheel drive and four wheel drive.

Further, the two/four wheel drive shifting device 326 is provided with free wheeling mechanisms 332 in order to reduce running resistance which occurs, when the two/four wheel drive shifting mechanism 328 shifts to two wheel drive, because the drive shaft 314 and the differential mechanism 318 are rotated, while both of which are in a non-driven state at the two wheel drive stage. The free wheel mechanisms 332 as illustrated in FIG. 9 are disposed in the right and left front wheels 304.

Upon shifting to two wheel drive, the free wheel mechanisms 332 are brought into a free state so as to drivingly disengage both of the front wheels 304 from the front wheel axles 322. As a result, the drive shaft 314 and the differential mechanism 318 are rotated independent of the front wheels 304, and the latter are thus prevented from producing unnecessary running resistance.

In addition, upon shifting to four wheel drive, the free wheel mechanisms 332 are adjusted into a locked state in order to connect both of the front wheels 304 to the front axles 322. As a result, the driving force to be transmitted through the drive shaft 314 is transmitted to the front wheels 304 through the differential mechanism 318 and the front axles 322.

An example of the above two/four wheel drive shifting device is disclosed in published Japanese Patent Application No. 4-66731. The device according to this publication has a transfer clutch disposed between the engine and one of the respective differential mechanisms for the front and rear wheels, and further has a free wheel clutch positioned between one of the above differential mechanisms and the wheels connected thereto. In this two/four wheel drive shifting device, the free wheel clutch is moved toward a locked position on the basis of a detection signal produced by a sensor. The sensor detects displacement of the transfer clutch toward the locked position. In this way, shifting from two wheel drive to four wheel drive is provided. Then, the two/four wheel drive shifting device is characterized in that, in order to lock the free wheel clutch before a sleeve for disconnecting the transfer clutch is engaged with a clutch-driven gear, the sensor is positioned in such a manner so as to detect displacement of the sleeve toward the locked position and then generate the detection signal before the same sleeve reaches a position where the sleeve initiates the engagement with the clutch-driven gear.

However, with conventional types of two/four wheel drive shifting devices, a problem lies in that a vehicle must be temporarily stopped when shifting between two wheel drive and four wheel drive. In addition, for manually operated free wheel mechanisms, the vehicle's driver must get out of the vehicle in order to switch the free wheel mechanisms between a free state and a locked state. Further, even for automatically operated free wheel mechanisms, when shifting from four wheel drive to two wheel drive occurs, the vehicle must be moved backward in order to switch the free wheel mechanisms from the locked state to the free state.

In such conventional devices, the automatically operated free wheel mechanism typically lacks any means for detecting the free and locked states thereof because of limited space availability. Only desired shifting between two wheel drive and four wheel drive is detected, and an indicating means shows success in shifting to the four wheel drive state.

As a result, another problem arises with the aforesaid two/four wheel drive shifting device which is free of means for detecting the free and locked states of the free wheel mechanisms. That is, when the aforesaid device is operated to shift to four wheel drive, it is impossible to notify the vehicle's driver as to whether or not the free wheel mechanisms are switched to the locked state so as to indicate that shifting to the four wheel drive has actually occurred. A still further problem is that, even when the free wheel mechanisms fail to switch to the locked state as a result of some cause, the indicating means erroneously shows that the four wheel drive is now in operation.

A yet further problem with conventional types of two/four wheel drive shifting device is that, when the means for detecting the free and locked states of the free wheel mechanisms are provided directly in the free wheel mechanisms, there occurs significant increases in component quantity, cost, and man hour as well as constraints on layout due to limited space availability. This is because such countermeasure adds a dedicated detection means to the two/four wheel drive shifting device.

SUMMARY OF THE INVENTION

To obviate the above-mentioned inconveniences and problems, the present invention provides a two/four wheel drive shifting device having: a transfer mechanism whereby driving force from an internal combustion engine disposed in a vehicle is fed and distributed to front and rear wheels; a two/four wheel drive shifting mechanism whereby the driving force to be delivered to one of the front and rear wheels through the transfer mechanism is interrupted or intermitted in order to allow shifting between two wheel drive and four wheel drive; a shift-detecting means for detecting shifting between two wheel drive and four wheel drive; an indicating means for showing the above-mentioned shifting; a free wheel mechanism disposed in one of a front wheel differential mechanism near the front wheels and a rear wheel differential mechanism near the rear wheels; an actuator for shifting the free wheel mechanism between a free state and a locked state; a pressure pump for supplying the actuator with a working pressure; a pressure-detecting means for detecting the working pressure supplied to the actuator; and a control means for controlling the pressure pump in order to supply the working pressure to the actuator when the shift-detecting means detects a success in shifting to four wheel drive, the control means also controlling the pump so as to deactivate the pressure pump and actuate the indicating means in order to show a successful shifting to four wheel drive when the pressure-detecting means detects that the working pressure has achieved a predetermined pressure, at which the shifting of the free wheel mechanism to the locked state is completed, wherein if the pressure-detecting means detects that the working pressure has not achieved the predetermined pressure, even when a predetermined time elapses after the pressure pump is driven, then the control means executes control to actuate the indicating means in order to show a failure in shifting the free wheel mechanism into the locked state.

The two/four wheel drive shifting device according to the present invention has the two/four wheel drive shifting mechanism provided in the transfer mechanism that permits the driving force from the internal combustion engine to be fed and distributed to the front and rear wheels. The device is further provided with: the shift-detecting means for detecting shifting between the two wheel drive and four wheel drive states; the indicating means for showing the success of the aforesaid shifting; the free wheel mechanism in one of the front wheel and rear wheel differential mechanisms; the actuator for shifting the free wheel mechanism; the pressure pump for supplying the actuator with a working pressure; the pressure-detecting means for detecting the working pressure supplied to the actuator; and the control means for controlling the pressure pump to actuate the pressure pump and supply the working pressure to the actuator when the shift-detecting means detects a success in shifting to four wheel drive. The control means further controls the pump so as to deactivate the pressure pump and actuate the indicating means in order to show a success in shifting to the four wheel drive state when the pressure-detecting means detects that the working pressure has achieved a predetermined pressure, at which the shifting of the free wheel mechanism to the locked state is completed.

As a result, using the detection signal from the pressure-detecting means, the two/four wheel drive shifting device can indirectly detect a success in shifting of the free wheel mechanism to the locked state without any means for detecting the free and locked states of the free wheel mechanism being directly disposed in the free wheel mechanism.

Further, in the two/four wheel drive shifting device, if the pressure-detecting means detects that the working pressure has not achieved a predetermined pressure, even when a predetermined time elapses after the pressure pump is actuated, then the control means executes a control so as to actuate the indicating means in order to show that the free wheel mechanism has failed to shift into the locked state.

Accordingly, using the detection signal from the pressure-detecting means, the two/four wheel drive shifting device can detect a failure in shifting of the free wheel mechanism into the locked state, without any means for detecting the free and locked states of the free wheel mechanism being directly disposed in the free wheel mechanism.

Further objects of the invention will be apparent to those of ordinary skill in the art upon reading the following description and inspecting the attached drawings.

DETAILED DESCRIPTION

An embodiment of the present invention will be described with reference to FIGS. 1–8.

Figure 8:
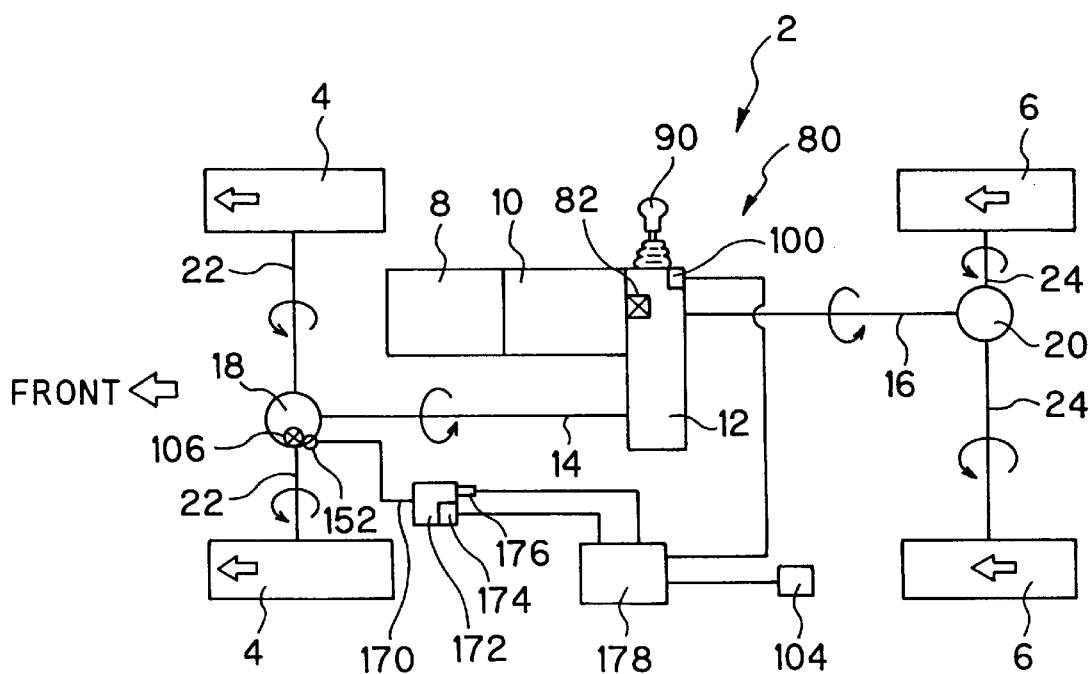
FIG. 8 is a schematic view illustrating a vehicle having the two/four wheel drive shifting device disposed therein.
Figure 9:
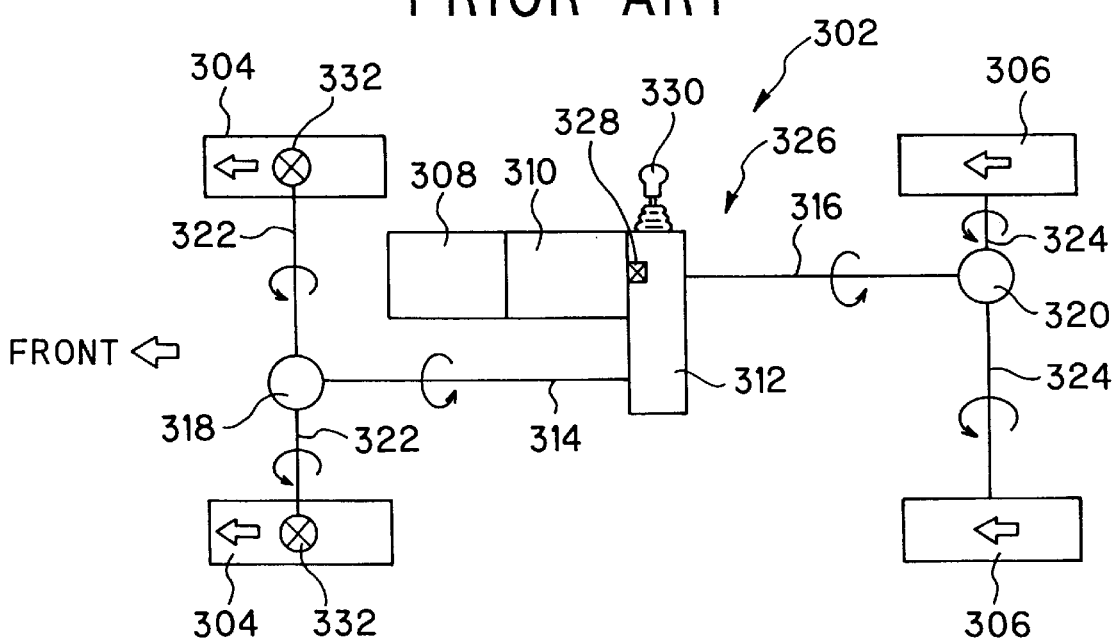
FIG. 9 is a schematic view showing a vehicle having a two/four wheel drive shifting device disposed therein according to the prior art.

In FIG. 8, reference numeral 2 denotes a vehicle; 4 front wheels; and 6 rear wheels. The vehicle 2 has an internal combustion engine 8 disposed therein and connected to a transmission 10. The transmission 10 is linked to a power transfer mechanism 12.

The transfer mechanism 12 receives a driving force from the engine 8 through the transmission 10 and feeds and distributes the driving force to a front wheel drive shaft 14 and a rear wheel drive shaft 16. A front wheel differential mechanism 18 and a rear wheel differential mechanism 20 cause the distributed driving force to be transmitted to the front wheels 4 and the rear wheels 6 through front wheel axles 22 and rear wheel axles 24, respectively.

Figure 2:
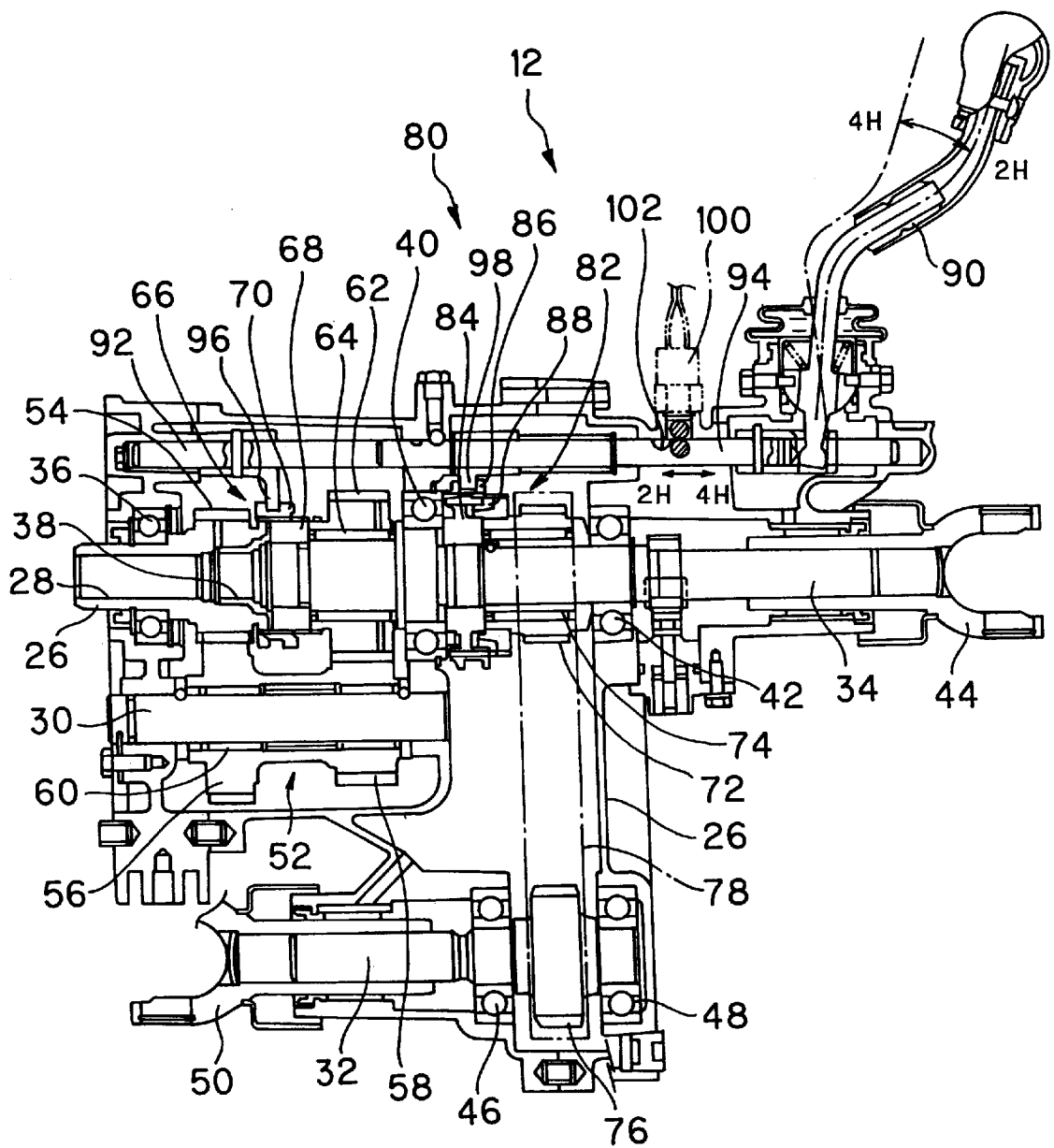
FIG. 2 is a cross-sectional view showing a transfer mechanism.

Referring now to FIG. 2, the transfer mechanism 12 is shown having the following arranged in a transfer case 26: an input shaft 28; a counter shaft 30; a forward output shaft 32; and a rearward output shaft 34.

The input shaft 28 is rotatably supported on the transfer case 26 by means of an input bearing 36. The counter shaft 30 is disposed parallel to the input shaft 28, and is fixedly positioned on the transfer case 26.

The rearward output shaft 34 is arranged in series with the input shaft 28. A front end of the output shaft 34 is rotatably supported on a rear end of the input shaft 28 by means of a rearward first bearing 38. Further, the output shaft 34 is supported on the transfer case 26 by means of second and third rearward bearings 40 and 42. The rearward output shaft 34 is connected to the rear drive shaft 16 through a rearward connection member 44.

The forward output shaft 32 is arranged parallel with the rearward output shaft 34, and is rotatably supported on the transfer case 26 by means of first and second forward bearings 46 and 48. The forward output shaft 34 is connected to the front drive shaft 14 through a forward connection member 50.

A low/high speed-shifting gear train 52 is provided between the input shaft 28, the counter shaft 30, and the rearward output shaft 34. This gear train 52 has an input gear 54 rigidly positioned on the input shaft 28. The gear train 52 further has integrally formed first and second counter gears 56 and 58 rotatably supported on the counter shaft 30 by means of a counter bearing 60. In addition, the gear train 52 has an output gear 62 rotatably supported on the rearward output shaft 34 by means of an output bearing 64.

A low/high speed-shifting mechanism 66 is disposed between the rear end of the input shaft 28 and a front end of the rearward output shaft 34. This mechanism 66 has a low/high speed-shifting hub 68 fixedly positioned on the rearward output shaft 34 and a low/high speed-shifting sleeve 70 provided on the hub 68 in an axially movable but non-rotatable manner.

The mechanism 66 drives the sleeve 70 into engagement with the input gear 54, and then connects the rearward output shaft 34 to the input shaft 28, whereby the rearward output shaft 34 is switched into a high speed engagement state. Meanwhile, the mechanism 66 brings the sleeve 70 into engagement with the output gear 62 for connection between the sleeve 70 and the rearward output shaft 34, while releasing. the rearward output shaft 34 from the input shaft 28. As a result, the output shaft 34 is switched into a low speed engagement state. A low/high speed-shifting shaft 92, discussed below, causes the sleeve 70 to provide the shifting actions.

The rearward output shaft 34 has a drive sprocket 72 rotatably supported thereon by means of a drive bearing 74. The forward output shaft 32 has a drive sprocket 76 fixedly located thereon. A chain 78 is engaged, i.e. reeved, between the sprockets 72 and 76. Thereby connecting the sprockets 72, 76 and hence the output shafts 32, 34 together.

The vehicle 2 is provided with a two/four wheel drive shifting device 80. This device 80 has a synchronized, two/four wheel shifting mechanism 82 provided in the transfer mechanism 12 on the rearward output shaft 34. This mechanism 82 has a two/four wheel drive shifting hub 84 fixedly located on the rearward output shaft 34, a two/four wheel drive shifting sleeve 86 provided on the hub 84 in an axially movable but non-rotatable manner, and a two/four wheel drive shifting synchronizing ring 88 provided on the drive sprocket 72.

Figure 3:
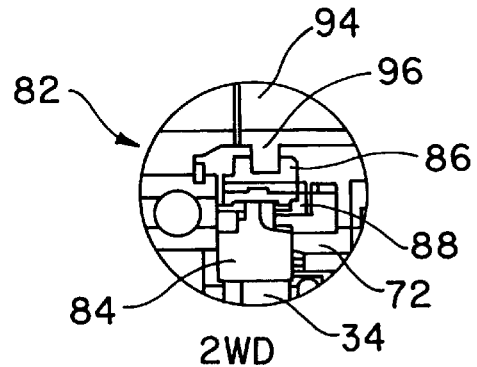
FIG. 3 is a cross-sectional view illustrating a two/four wheel drive shifting mechanism in a state of shifting to two wheel drive.
Figure 4:
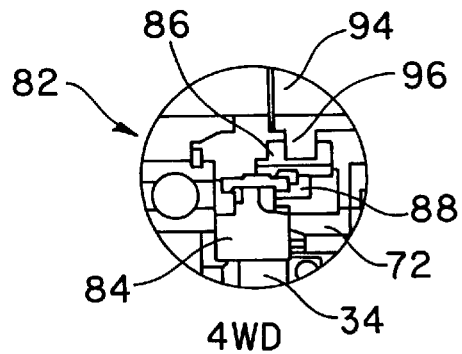
FIG. 4 is a cross-sectional view illustrating the two/four wheel drive shifting mechanism in a state of shifting to four wheel drive.

As illustrated in FIG. 4, the two/four wheel drive shifting mechanism 82 causes the sleeve 86 to be engaged with the sprocket 72 so as to be connected to the output shaft 34. This engagement provides a shift to four wheel drive, whereby the driving force is delivered and distributed to the output shafts 32 and 34. Conversely, the two/four wheel drive shifting mechanism 82 as shown in FIG. 3 causes the sleeve 86 to be disengaged from the sprocket 72 so as to be released from and out of connection with the output shaft 34. This provides shifting to two wheel drive, whereby the driving force is fed only to the rearward output shaft 34.

A transfer shift lever 90 is pivotably supported on the transfer case 26 with the aid of a concave and convex configuration thereon. The lever 90 is in selective engagement with the low/high speed shifting shaft 92 and a two/four wheel drive shifting shaft 94, both of which are axially movable. The shafts 92 and 94 are supported on the transfer case 26 in an axially movable manner and are parallel to both the input shaft 28 and the rearward output shaft 34.

The low/high speed shifting shaft 92 is connected to the aforesaid low/high speed shifting sleeve 70 through a low/high speed shifting fork 96. The two/four wheel drive shifting shaft 94 is connected to the two/four wheel drive shifting sleeve 86 through a two/four wheel drive shifting fork 98.

The transfer shift lever 90 is driven into selective engagement with the low/high speed shifting shaft 92 so as to axially move the shaft 92, whereby the low/high speed shifting sleeve 70 actuates shifting actions for shifting between a high speed engagement state and a low speed engagement state. Further, the transfer shift lever 90 selectively engages the two/four wheel drive shifting shaft 94 so as to axially move the shaft 94, whereby the two/four wheel drive shifting sleeve 86 provides shifting actions for shifting between the two wheel drive and four wheel drive states.

The two/four wheel drive shifting device 80 is provided with a shift-detecting switch 100 by way of a shift-detecting means for detecting a shift action between the two wheel drive and four wheel drive states actuated by the two/four wheel drive shifting mechanism 82. The shift-detecting switch 100 detects such shifting by being brought into and out of engagement with an engagement recess 102. The recess 102 is provided on the two/four wheel drive shifting shaft 94.

The two/four wheel drive shifting device 80 is further provided with an indicator 104, such as a lamp, by way of an indicating means for showing the act of shifting between two wheel drive and four wheel drive as caused by the two/four wheel drive shifting mechanism 82. The indicator 104 is disposed on an instrument panel (not shown) of the vehicle 2.

Figure 1:
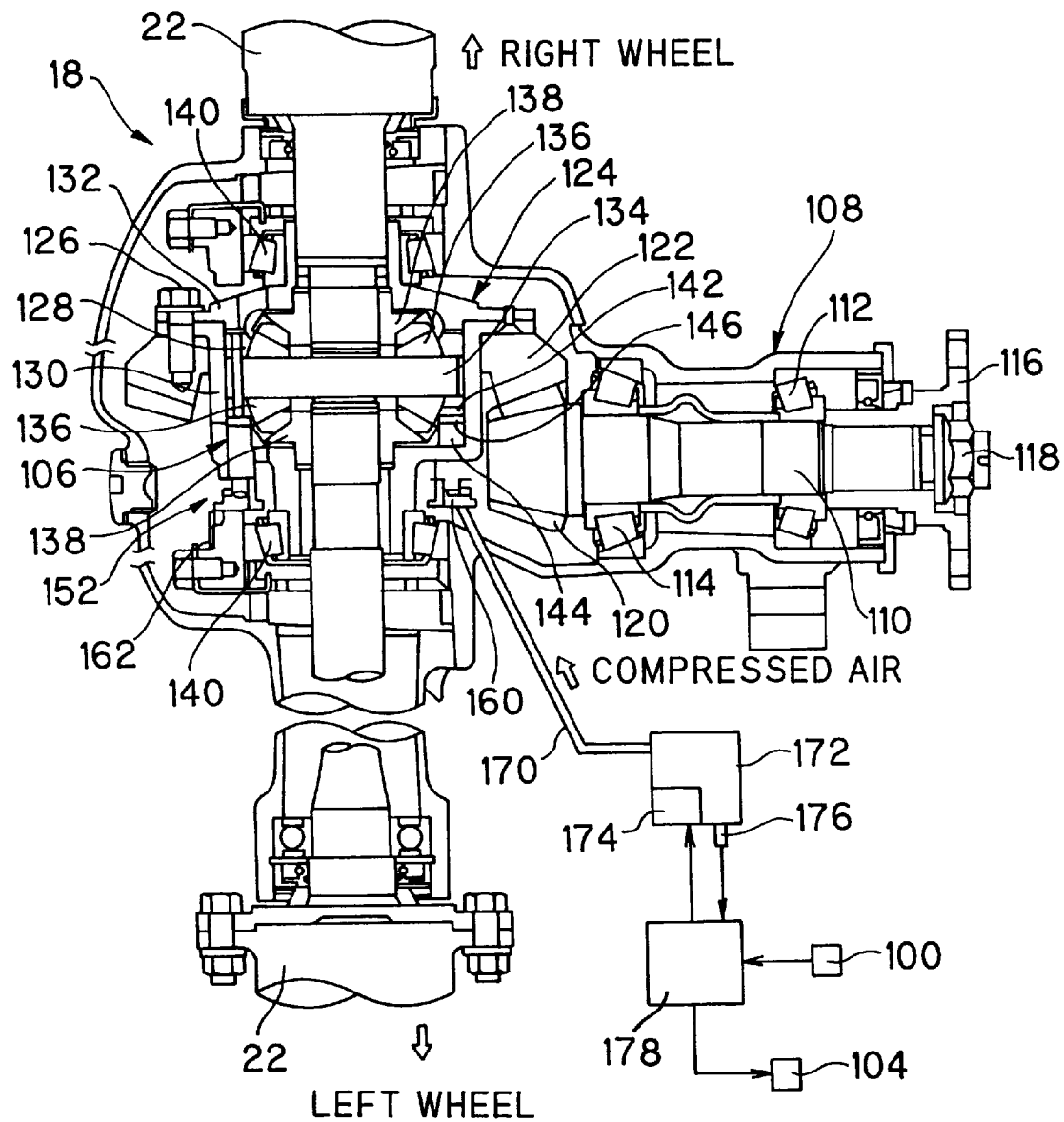
FIG. 1 is a cross-sectional view illustrating a front wheel drive differential mechanism in accordance with an embodiment of the present invention.

The device 80 has a free wheel mechanism 106 provided in either the front wheel differential mechanism 18 near the front wheels 4 or the rear wheel differential mechanism 20 near the rear wheels 6. As shown in FIG. 1, in this embodiment the free wheel mechanism 106 is provided in the front wheel differential mechanism 18.

The front wheel differential mechanism 18 has a drive shaft 110 rotatably supported on a differential carrier 108 by means of first/second drive bearings 112 and 114. The drive shaft 110 is provided with a drive shaft connecting flange 116 at one end and a drive pinion 120 at the other end. The flange 116 is mounted thereon by means of a fitting nut 118, and is connected to the front wheel drive shaft 14.

The drive pinion 120 on the drive shaft 110 engages a drive gear 122. The drive gear 122 is mounted on a differential case 124 by means of a fixing bolt 126. The differential case 124 includes an inner case section 128, an outer case section 130, and an outer cover section 132.

The inner case 128 is rotatably disposed within the outer case section 130. The inner case 128 holds a pinion shaft 134 on which a differential pinion 136 is rotatably supported. The differential pinion 136 is meshed with differential side gears 138 on the right and left sides thereof.

Together with the drive gear 122, the outer cover section 132 is mounted on the outer case section 130 by means of a fixing bolt 126. The outer case section 130 is positioned in a relatively rotatable manner with respect to the inner case section 128. The outer case section 130 and the outer cover section 132 are rotatably supported on the differential carrier 108 by means of first and second differential bearings 140. The aforesaid differential side gears 138 are connected to respective inner end portions of the front wheel axles 22.

The free wheel mechanism 106 has an inner-side dog 142 disposed at the inner case section 128, an outerside dog member 144 positioned within the outer case section 130, and an outer-side dog 146 provided on the outer-side dog member 144. The inner-side dog 142 is directed in a direction of the front wheel axle 22 on the left side, and has an annular form. The dog member 144 has an annular form and is arranged so as to oppose the inner-side dog 142. The outer-side dog 146 has an annular form, and is further adapted to be brought into and out of engagement with the inner-side dog 142.

Figure 5:
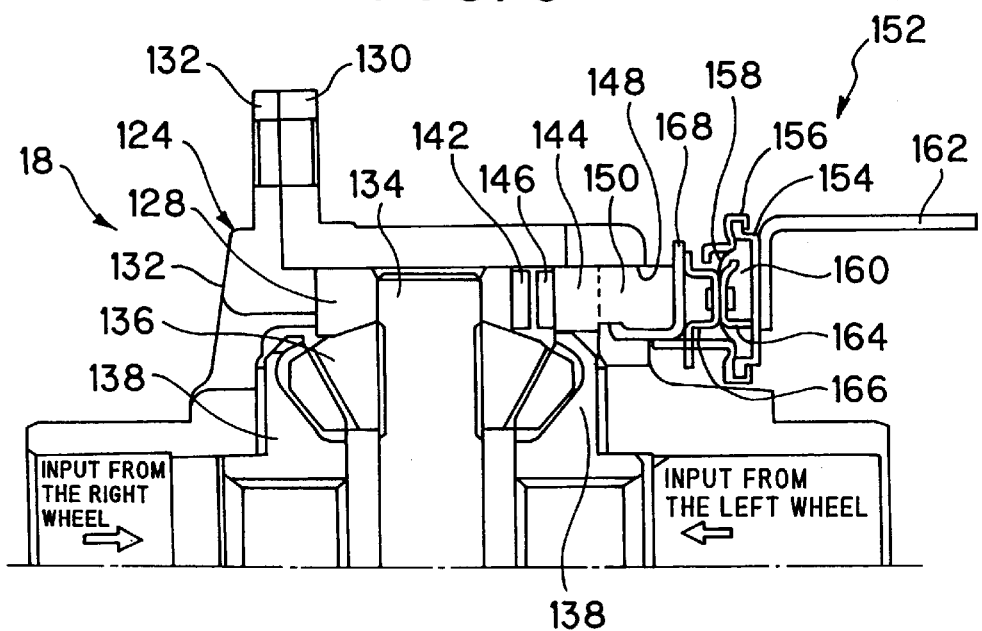
FIG. 5 is a cross-sectional view showing the front wheel drive differential mechanism in which a free wheel mechanism has been shifted to a free state.

As illustrated in FIG. 5, the free wheel mechanism 106 is in a free state when the outer-side dog 146 is disengaged from the inner-side dog 142. Then, the differential mechanism 18 is deactivated by the inner case section 128 and the outer case section 130 being is rendered relatively rotatable. The front wheel drive shaft 14 and the front wheel differential mechanism 18 are thus freely rotatable relative to the front wheels 4 so as to prevent useless running resistance.

Figure 6:
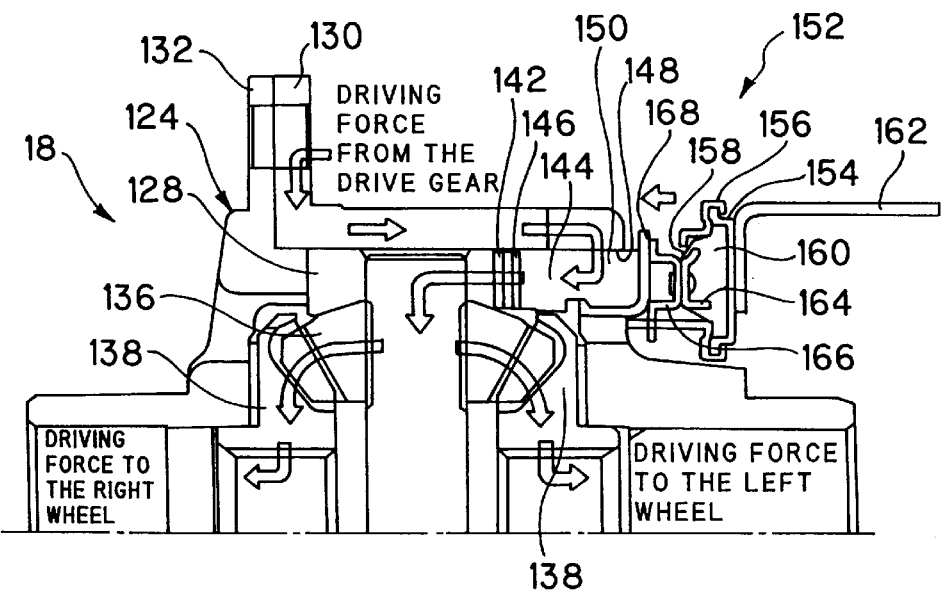
FIG. 6 is a cross-sectional view showing the front wheel drive differential mechanism in which the free wheel mechanism has been shifted to a locked state.

As illustrated in FIG. 6, the free wheel mechanism 106 assumes a locked state when the outer-side dog 146 is engaged with the inner-side dog 142. Then, the front wheel differential mechanism 18 is activated by the inner case section 128, the outer case section 130, and the outer cover section 132 being connected together. As a result, the driving force transmitted by the shaft 14 is conducted to the front wheels 4 through both the differential mechanism 18 and the front axles 22.

The outer-side dog member 144 is provided with extensions 150, wherein the extensions 150 extend outwardly through a through-hole 148 of the outer case section 130. An adequate number of the extensions 150 are provided so as to project outwardly from the outer case section 30. In addition, the extensions 150 are connected to an actuator 152. The actuator 152 causes the free wheel mechanism 106 to be switched between the free and locked states.

The actuator 152 has an annular-shaped, gas tight flexible member 158 held between annular-shaped, first and second members 154 and 156, thereby defining a pressure chamber 160. The actuator 152 has the first member 154 mounted on the differential carrier 108 by means of a mounting member 162. The flexible member 158 has a support member 164 disposed inside the pressure chamber 160 and a drive member 166 provided outside the chamber 160. The drive member 166 is connected to the aforesaid extension 150 through a connection member 168.

The pressure chamber 160 is connected to a pressure pump 172 for supplying working pressure thereto through a pressure passage 170. The pressure pump may be a conventional pneumatic pump. The pressure pump 172 is driven by a pump motor 174, and compressed air is supplied to the pressure chamber 160 through the passage 170 by way of working pressure. A pressure switch 176 is provided for detecting the working pressure "P" supplied to the pressure chamber 160 through passage 170. The pressure switch 176 may be provided at a location along the pressure passage 170 between the pump 172 and the actuator 152. However, as shown in FIG. 1, the pressure detecting switch 176 may be mounted to the pressure pump 172.

The two/four wheel drive shifting mechanism 82 has a control means 178 connected to: the shift-detecting switch 100 for detecting shifting between the two wheel and four wheel drive stages as caused by the two/four wheel drive shifting mechanism 82; the indicator 104 for showing the preceding shift; the pump motor 174 for driving the pressure pump 172; and the pressure switch 176 for detecting working pressure "P" to be fed to the pressure chamber 160 of the actuator 152. The control means 178 may be an electronic device adapted to perform the required control steps and decisions.

When the shift-detecting switch 100 detects a successful shifting to four wheel drive, the control means 178 provides a control signal to actuate the pressure pump 172 and supply working pressure "P" to the pressure chamber 160 of the actuator 152. Further, when the pressure switch 176 detects that the working pressure has achieved a predetermined pressure "Ps", at which the shifting of the free wheel mechanism 106 to a locked state has been completed. Then the control means 178 executes a control signal to deactivate the pressure pump 172 and actuate the indicator 104 to show a successful shifting to four wheel drive.

In addition, if the pressure switch 176 detects that working pressure "P" has not achieve predetermined pressure "Ps", even when a predetermined time "t" elapses after the pressure pump 172 is actuated, then the control means 178 executes a control signal to actuate the indicator 104 in order to show that the free wheel mechanism 106 has failed to shift into the locked state.

Next, the operation of this embodiment of the invention will be briefly described.

The two/four wheel drive shifting device 80 in the vehicle 2 has the synchronized, two/four wheel drive shifting mechanism 82 disposed in the transfer mechanism 12, and the free wheel mechanism 106 positioned in the front wheel differential mechanism 18.

The two/four wheel drive shifting mechanism 82 connects the driving sprocket 72 to the rearward output shaft 34, thereby shifting into four wheel drive. As a result, the driving force is fed and distributed to both the forward and rearward output shafts 32 and 34. Also, the mechanism 82 releases the driving sprocket 72 from the rearward output shaft 32, thereby shifting into two wheel drive. As a result, in this condition, the driving force is delivered only to the rearward output shaft 34.

When the two wheel drive is operative, the driving force from the engine 2 is transmitted from the rearward output shaft 34 to the rear wheel differential mechanism 20 through the rear wheel drive shaft 16, whereby the rear wheels 6 are driven by the rear wheel axles 24. No driving force is transmitted to the forward output shaft 34. Thus the forward output shaft 34, the front wheel drive shaft 14, and the front wheel differential mechanism 18 are at rest.

In order to provide four wheel drive while the vehicle 2 is running in two wheel drive, the transfer shift lever 90 is manually moved to axially move the two/four wheel drive shifting shaft 94. Then, the two/four wheel drive shifting sleeve 86 and the two/four wheel drive shifting ring 88 operate to influence the driving sprocket 72 that is in an idling state with respect to the revolving output shaft 32. More specifically, rotation of the driving sprocket 72 is accelerated in stages to correspond with the rotational speed of the rearward output shaft 34.

When being synchronized with the rotational speed of the output shaft 34, then the sprocket 72 is connected to the output shaft 34. The sprocket 72 thus linked to the rearward output shaft 34 transmits the driving force to the forward output shaft 32, the front wheel drive shaft 14, and the front wheel differential mechanism 18 through the drive sprocket 76 by means of the chain 78. As a result, the shafts 32, 14 and the differential mechanism 18 are rotated at a speed corresponding to vehicle velocity.

Accordingly, when shifting from two wheel drive to four wheel drive, the synchronizing two/four wheel drive shifting mechanism 82 initially increases both the drive shaft 14 and the differential mechanism 18 in rotational speed to the level corresponding with the vehicle velocity before allowing a shift to four wheel drive. As a result, the vehicle 2 need not be temporarily stopped, which thus facilitates shifting operations. In this connection, the two/four wheel drive shifting mechanism 82 may have the same synchronizing mechanism as one used for a change of gears in the transmission.

Now, attention is directed to the free wheel mechanism 106 disposed in the front wheel differential mechanism 18. When the two wheel drive stage is in operation, the free wheel mechanism 106 is held in a free state because the outer-side dog 146 is disengaged from the inner-side dog 142 as a result of the outer-side dog member 144 being retracted by the release of pressure from the pressure chamber 160 of actuator 152. While the free wheel mechanism 106 is in the free state, then the drive shaft 110 and drive gear 122 of the differential mechanism 18 as well as the outer case section 130 and outer cover section 132 of the differential case 124 are all at rest. Rotation from the front wheels 4 imparts respective rotations to the front wheel axles 22, the inner case section 128, the pinion shaft 134, the differential pinion 136, and the differential side gear 138.

In order to shift to four wheel drive while the vehicle 2 is running in two wheel drive, the transfer shift lever 90 is moved to axially move the two/four wheel drive shifting shaft 94. Then, an ON-signal from the shift-detecting switch 100 enters the control means 178. The control means 178 switches on the pump motor 174 to actuate the pressure pump 172, thereby supplying working pressure "P" to the pressure chamber 160 of actuator 152.

In the actuator 152, working pressure "P" acting on the pressure chamber 160 expands the flexible member 158. As a result, the drive member 166 thrusts the extension 150 of the outer-side dog member 144, whereby the outer-side dog 146 is engaged with the inner-side dog 142, and the free wheel mechanism 106 is switched into a locked state.

In the two/four wheel drive shifting device 80, when the aforesaid working pressure "P" achieves the predetermined pressure "Ps", then an ON-signal enters the control means 178. The control means 178 turns off the pump motor 174 in order to shut down the pressure pump 172, and further turns on the indicator 104 in order to indicate that four wheel drive is now operative.

Thus, the two/four wheel drive shifting device 80 switches the free wheel mechanism 106 between the free and locked states, in unison with the shifting between two wheel drive and four wheel drive. This eliminates the need for a driver to step out of the vehicle and then effect the required switching operations. In addition, the driving force to the front wheels 4 can be continued and discontinued without the need to move the vehicle 2 backward.

Figure 7:
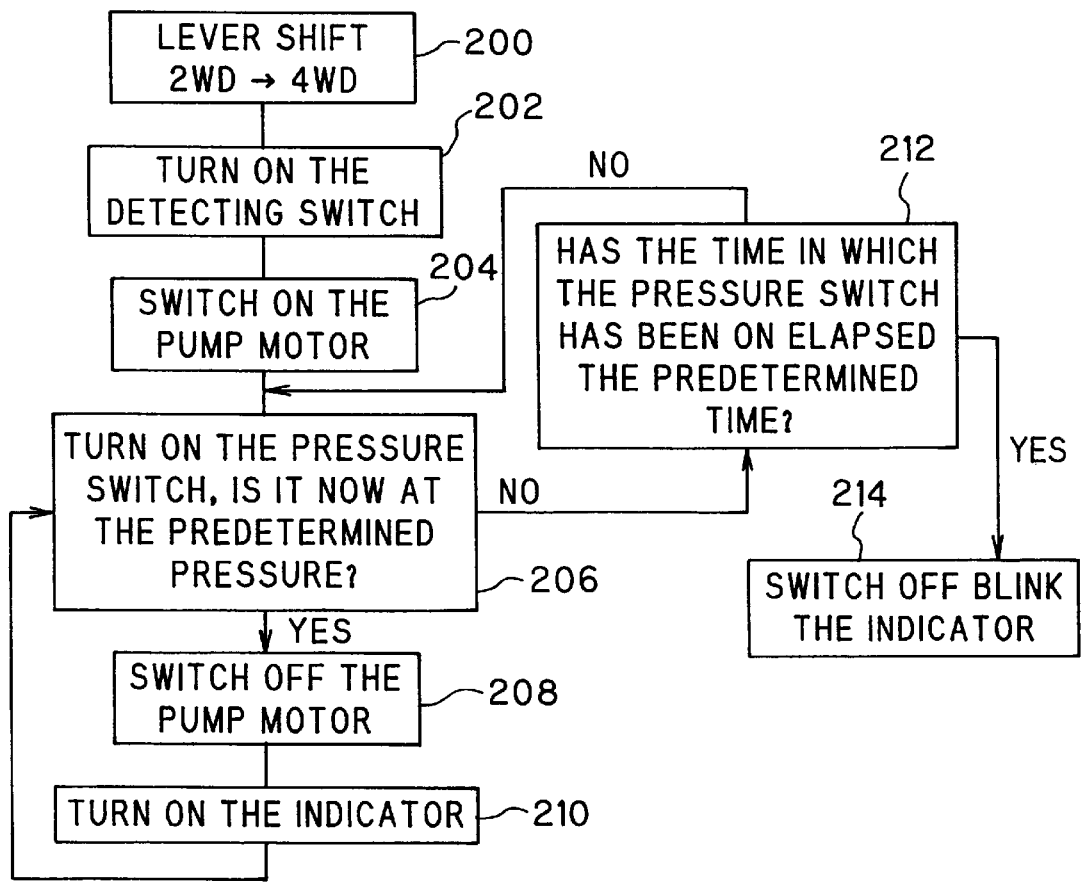
FIG. 7 is a control flow chart.

The control steps according to the device 80 will now be described with reference to FIG. 7.

When the transfer shift lever 90 is operated to shift from two wheel drive to four wheel drive by means of the two/four wheel drive shifting mechanism 82 (step 200), then the shift-detecting switch 100 is turned on and detects a success in shifting to four wheel drive (step 202).

The ON-signal from the shift-detecting switch 100 enters the control means 178. Then the control means 178 switches on the pump motor 174, thereby actuating the pressure pump 172 (step 204). As a result, working pressure "P" is supplied to the pressure chamber 160 of the actuator 152. This causes expansion of the pressure chamber 160 in the actuator 152, as illustrated in FIG. 6, and the drive member 166 of the flexible member 158 thereby pushes the extension 150 of the outer-side dog member 144. As a result, the outer-side dog 146 is driven into engagement with the inner-side dog 142, whereby the free wheel mechanism 106 is shifted into a locked state.

The pressure switch 176 determines whether or not working pressure "P", which is supplied to the pressure chamber 160, has achieved the predetermined pressure "Ps" (step 206).

When working pressure "P" has achieved predetermined pressure "Ps" (step 206 is "YES"), then the pressure switch 176 is turned off and detects that working pressure "P" has reached predetermined pressure "Ps". Then the pump motor 174 is switched off to stop the pressure pump 172 (step 208). Further, the indicator 104 is actuated to indicate a success in shifting to four wheel drive (step 210).

More specifically, the control means 178 deems a success in shifting to four wheel drive under the condition that the shift-detecting switch 100 is turned on and the pressure switch 176 is turned off upon the shifting to four wheel drive. Then the control means causes the indicator 104 to turn on and show the operator that the shifting to four wheel drive was successful.

Meanwhile, when the aforesaid step 206 determines that working pressure "P" has not achieved predetermined pressure "Ps" (i.e. step 206 is "NO"), then a determination is made as to whether time "t", during which time the pressure switch 176 is on, has elapsed beyond the predetermined time "ts" (step 212).

When the preceding time "t" has not elapsed beyond predetermined time "ts" (step 212 is "NO"), this routine is returned to the previous determination step 206. When the above time "t" has elapsed beyond predetermined time "ts" (step 212 is "YES"), then the indicator 104 is actuated to either turn off or blink, thereby showing that the free wheel mechanism 106 has failed to shift into the locked state (step 214).

More specifically, if a fluid leakage occurs in a pressure line system between the pressure pump 172 and the pressure chamber 160, then working pressure "P" in the chamber 160 is reduced below predetermined pressure "Ps". As a result, the pressure switch 176 is turned on, and the pump motor 174 is switched on, thereby actuating the pressure pump 172.

When a large amount of fluid leakage occurs, working pressure "P" in the pressure chamber 160 does not achieve predetermined pressure "Ps". As a result, actuation of the pressure pump 172 caused by the pump motor 174 being switched on is continued, and the pressure switch 176 also continues to be on.

Thus, the control means 178 judges that the free wheel mechanism 106 has failed to shift into the locked state when time "t", during which the pressure switch 176 is on, has elapsed beyond the predetermined time "ts". Then the control means 178 deems the vehicle is in a non-four wheel drive state, and advises the vehicle's driver thereby by either switching off or blinking the indicator 104.

As previously described, the two/four wheel drive shifting device 80 has the synchronized, two/four wheel drive shifting mechanism 82 provided in the transfer mechanism 12 which permits the driving force from the engine 8 to be fed and distributed to the front and rear wheels 4 and 6. The device 80 is further provided with: the shift-detecting switch 100 for detecting shifting between two wheel drive and four wheel drive; the indicator 104 for showing the aforesaid shifting; the actuator 152 for shifting of the free wheel mechanism 106 which is provided in the front wheel differential mechanism 18; the pressure pump 172 for supplying the actuator 152 with working pressure; and the pressure switch 176 for detecting the working pressure.

In the two/four wheel drive shifting device 80, when the shift-detecting switch 100 detects a success in shifting to four wheel drive, then the control means 178 executes control so as to actuate the pressure pump 172 and supply working pressure to the pressure chamber 162 of the actuator 152. The free wheel mechanism 106 is thereby shifted from a free state to a locked state.

In the two/four wheel drive shifting device 80, when the pressure switch 176 detects that working pressure "P" has achieved predetermined pressure "Ps", at which the shifting of the free wheel mechanism 106 into the locked state is completed, then the control means 178 provides control to deactivate the pressure pump 172 and the switch on the indicator 104 in order to show the operator that shifting into four wheel drive was successful.

As a result, using a detection signal from the pressure switch 176 for detecting working pressure "P" in the actuator 152, the two/four wheel drive shifting device 80 can determine and detect a successful shifting of the free wheel mechanism 106 into the locked state, without any means for detecting the free and locked states of the free wheel mechanism 106 being disposed directly in the free wheel mechanism 106. Thereby the difficulty of housing detection components in the free wheel mechanism because of the limited space availability is overcome.

Further, in the two/four wheel drive shifting device 80, if the pressure switch 176 detects that working pressure "P" has not achieved predetermine pressure "Ps" and after predetermined time "ts" elapses after the pressure pump 172 is driven, then the control means 178 executes control to either blink or turn off the indicator 104 in order to show that the free wheel mechanism 106 has failed to shift into the locked state.

As a result, using the detection signal from the pressure switch 176, the two/four wheel drive shifting device 80 can determine and detect a failure in shifting of the free wheel mechanism 106 to the locked state, without any means or components for detecting the free and locked states of the free wheel mechanism 106 being disposed directly in the free wheel mechanism 106.

Thus, with the two/four wheel drive shifting device 80 it is possible to detect both a success and a failure in the shifting of the free wheel mechanism 106 into the locked state without any means or components for detecting the free and locked states of the mechanism 106 being provided directly in the free wheel mechanism 106. Accordingly, the device 80 is built with fewer components and at lower cost. Further, the device 80 can notify the vehicle's driver of an actual success in shifting to four wheel drive.

As evidenced by the above description, in the two/four wheel drive shifting device according to the present invention, upon shifting to four wheel drive, the control means executes control steps to actuate the pressure pump in order to supply the working pressure to the actuator. Further, when the working pressure has achieved a predetermined pressure, at which the shifting of the free wheel mechanism into the locked state is completed, then the control means provides control steps to deactivate the pressure pump and actuate the indicating means in order to show successful shifting to four wheel drive.

Further, in the two/four wheel drive shifting device, if the pressure-detecting means detects that the working pressure has not achieved the predetermined pressure, after a predetermined time elapses when the pressure pump is driven, then the control means executes control steps to actuate the indicating means in order to show that the free wheel mechanism has failed to shift into the locked state.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A two wheel/four wheel drive shifting device for a vehicle, comprising:
    a transfer mechanism for distributing driving force from an internal combustion engine to front and rear wheels;
    a two/four wheel drive shifting mechanism for shifting between two and four wheel drive whereby the driving force to be delivered to said wheels through said transfer mechanism is interrupted in order to allow shifting between two wheel drive and four wheel drive;
    said two/four wheel drive shifting mechanism including a shift-detecting means for detecting the shift between two wheel drive and four wheel drive;
    an indicating means for indicating the shifting;
    a free wheel mechanism disposed in one of a front wheel differential mechanism near said front wheels and a rear wheel differential mechanism near said rear wheels;
    an actuator for shifting said free wheel mechanism between a free state and a locked state;
    a pressure pump for supplying said actuator with a working pressure;
    a pressure-detecting means for detecting the working pressure supplied to said actuator; and
    a control means for controlling said pressure pump in order to supply the working pressure to said actuator when said shift-detecting means detects shifting to four wheel drive, said control means also controlling to deactivate said pressure pump and actuating said indicating means to show a success in shifting to four wheel drive when said pressure-detecting means detects that the working pressure has achieved a predetermined pressure at which the shifting of said free wheel mechanism to the locked state is completed, and said control means actuating said indicating means to show a failure in shifting of said free wheel mechanism into the locked state when said pressure-detecting means detects that the working pressure has not achieved the predetermined pressure after a predetermined time elapses after said pressure pump is actuated.

2. The two/four wheel drive shifting device according to claim 1, wherein said free wheel mechanism is free from any means disposed therein for detecting the free and locked states.

3. The two/four wheel drive shifting device according to claim 1, wherein said indicating means comprises a single indicator indicating both success and failure in shifting to four wheel drive in response to said shift-detecting means and said pressure-detecting means.

4. A method for controlling a two/four wheel drive shifting device, comprising the steps of:

changing the state of a shift control device from a two wheel drive position to a four wheel drive position;

activating a fluid pump to produce a pressure supplied to a pressure chamber of the actuator for locking wheel hubs to engage four wheel drive;

determining whether the pressure in the pressure chamber has reached a given pressure;

when the given pressure is reached in the pressure chamber, deactivating the pressure pump and indicating that the shift to four wheel drive was successful; and when the given pressure is not reached in the pressure chamber, determining whether a time constant has elapsed since the shift to four wheel drive was initiated and indicating that the shift to four wheel drive was unsuccessful.

5. The method according to claim 4, further comprising the steps of:

activating a shift detection switch when the shift control device changes to the four wheel drive position producing a shift signal;

receiving the shift signal in a control device;

controlling the fluid pump with the control device;

storing the given pressure and time constant in the control device; and performing the steps of determining whether the given pressure has been reached and determining whether the time constant has elapsed in the control device.

6. The method according to claim 5, further comprising the step of activating an indicator to inform a user that the steps for shifting to four wheel drive have begun, and wherein the step of indicating that the shift was unsuccessful includes operating the indicator in a manner different from the step of activating the indicator.

7. A two wheel/four wheel drive shifting device for a vehicle, comprising:

a transfer mechanism for distributing driving force from an internal combustion engine to front and rear wheels;

a two/four wheel drive shifting mechanism for shifting between two wheel drive and four wheel drive;

said two/four wheel drive shifting mechanism including a shift-detecting means for detecting the shift between two wheel drive and four wheel drive;

an indictor for indicating the shifting;

a free wheel mechanism disposed in one of a front wheel differential mechanism near said front wheels and a rear wheel differential mechanism near said rear wheels, wherein said free wheel mechanism is free from any means disposed therein for detecting a free state or a locked state thereof;

an actuator for shifting said free wheel mechanism between the free state and the locked state;

a pressure pump for supplying said actuator with a working pressure;

a pressure-detecting means for detecting the working pressure supplied to said actuator; and a control means for controlling said pressure pump in order to supply the working pressure to said actuator when said shift detecting means detects shifting to four wheel drive, said control means actuating said indicator to show a success in shifting to four wheel drive when said pressure-detecting means detects that the working pressure has achieved a predetermined pressure at which the shifting of said free wheel mechanism to the locked state is completed.

8. A two/four wheel drive shifting device according to claim 7, wherein when said pressure-detecting means detects that the working pressure has not achieved the predetermined pressure after a predetermined time elapses after said pressure pump is actuated, said control means operates said indicator in a different manner to indicate a failure in shifting of said free wheel mechanism into the locked state.

* * * * *